United States Patent [19]

Döbert et al.

[11] Patent Number: 6,001,924
[45] Date of Patent: Dec. 14, 1999

[54] AQUEOUS POLYMER/POLYURETHANE RESIN BINDER VEHICLE DISPERSION AND THE PRODUCTION THEREOF, AND COATING MEDIA AND THE USE THEREOF

[75] Inventors: Jürgen Döbert, Sprockhövel; Bettina Vogt-Birnbrich, Solingen; Armin Göbel, Wetter; Marcus Brunner, Wuppertal, all of Germany

[73] Assignee: Herberts GmbH, Wuppertal, Germany

[21] Appl. No.: 09/101,849

[22] PCT Filed: Jan. 15, 1997

[86] PCT No.: PCT/EP97/00150

§ 371 Date: Jul. 20, 1998

§ 102(e) Date: Jul. 20, 1998

[87] PCT Pub. No.: WO97/26289

PCT Pub. Date: Jul. 24, 1997

[30] Foreign Application Priority Data

Jan. 20, 1996 [DE] Germany ............... 196 02 040

[51] Int. Cl.$^6$ ............... C08J 3/00; C08K 3/20; C08L 75/00; C08F 8/30; B05D 3/02
[52] U.S. Cl. ............... 524/591; 427/372.2; 427/385.5; 524/507; 524/588; 524/839; 524/840; 525/123; 525/127; 525/128; 525/131; 525/455
[58] Field of Search ............... 524/507, 591, 524/839, 840, 588; 525/123, 455, 127, 128, 131; 427/372.2, 385.5

[56] References Cited

U.S. PATENT DOCUMENTS

| | | |
|---|---|---|
| 5,041,494 | 8/1991 | Franke et al. . |
| 5,334,420 | 8/1994 | Hartung et al. . |
| 5,654,391 | 8/1997 | Göbel et al. . |
| 5,691,425 | 11/1997 | Klein et al. . |

FOREIGN PATENT DOCUMENTS

| | | |
|---|---|---|
| 0 297 576 | 1/1989 | European Pat. Off. . |
| 0 315 006 | 5/1989 | European Pat. Off. . |
| 0 353 797 | 2/1990 | European Pat. Off. . |
| 0 401 565 | 12/1990 | European Pat. Off. . |
| 0 424 705 | 5/1991 | European Pat. Off. . |
| 0 522 420 | 1/1993 | European Pat. Off. . |
| 0 662 992 | 7/1995 | European Pat. Off. . |
| 0 678 536 | 10/1995 | European Pat. Off. . |
| WO 89/10380 | 11/1989 | WIPO . |
| 9514721 | 6/1995 | WIPO . |

*Primary Examiner*—Patrick D. Niland
*Attorney, Agent, or Firm*—Pillsbury Madison & Sutro LLP

[57] ABSTRACT

An aqueous binder vehicle dispersion and coating media, which can be used for multi-layer coating, wherein the dispersion is obtainable by the reaction of I. 20 to 97% by weight of a polyurethane(-urea) resin containing groups which are reactive towards a chain extender IV), having a number average molecular weight (Mn) of 1000 to 10,000, and 8 to 80 milliequivalents per 100 g of ionic groups, groups which can be converted into ionic groups and/or hydrophilic groups, II. 0 to 30% by weight of a polyester resin having a number average molecular weight (Mn) of 500 to 5000, and having the same groups as in I) which are reactive towards IV), and III. 3 to 80% by weight of a (meth)acrylic copolymer containing 0 to 40 milliequivalents per 100 g of ionic groups, groups which can be converted into ionic groups with the same charge as in I) and/or hydrophilic groups, having the same groups as in I) and II) which are reactive towards IV), wherein at least 50% by weight of III) has been produced in the presence of at least part of components I) and/or II), with IV. one or more chain extenders, and conversion into the aqueous phase.

19 Claims, No Drawings

AQUEOUS POLYMER/POLYURETHANE RESIN BINDER VEHICLE DISPERSION AND THE PRODUCTION THEREOF, AND COATING MEDIA AND THE USE THEREOF

This application is the national phase of international application PCT/EP97/00150 filed Jan. 15, 1997.

FIELD OF THE INVENTION

This invention relates to aqueous binder vehicle dispersions based on hybrid polymers, which are produced by the reaction of polyurethane(-urea) resins and optionally additional polyesters and of (meth)acrylic copolymers which are produced in the presence of the polyurethane(-urea) resins and/or polyesters. The invention also relates to the process for producing these hybrid polymers, and to aqueous coating media which can be produced therefrom, and to methods of multi-layer coating using these coating media.

BACKGROUND OF THE INVENTION

In the automobile industry, metal and plastics parts are provided with multi-layer coatings. These serve to protect the substrates from corrosion, but should also exhibit a good decorative effect. They are generally multi-layer coatings based on a primer coat and one or more subsequent coats, e.g. base lacquer coats, covering lacquer coats, which can then be provided with a transparent clear lacquer as a subsequent coating.

Water-thinnable base lacquers based on polyurethane/ poly(meth)acrylate polymer hybrids are known.

EP-A-0 297 576 describes the polymerisation of (meth) acrylic monomers in the presence of polyurethane dispersions which have been produced beforehand. After polymerisation is complete, aqueous base lacquers can be produced from the dispersions obtained.

EP-A-0 353 797 describes the production of a hydroxy-functional polyurethane resin in an unsaturated monomer as a solvent, wherein the unsaturated monomer may be reactive towards isocyanate. After conversion of the polyurethane solution into the aqueous phase, an emulsion polymerisation is carried out. The hybrid polymer dispersion which is obtained can be used as a binder vehicle for aqueous base lacquers.

EP-A-0 401 565 describes aqueous base lacquers, the binder vehicles of which are produced by the emulsion polymerisation of aqueous emulsions, which are prepared with the addition of external emulsifiers, of polyurethane macromonomers which have been functionalised to render them unsaturated and which are dissolved in unsaturated monomers.

EP-A-0 424 705, EP-A-0 521 928, EP-A-0 522 419, EP-A-0 522 420, EP-A-0 662 992 and WO 95/14721 describe aqueous base lacquers which are based on polyurethane/poly(meth)acrylate polymer hybrids, wherein the polymer- hybrids have been synthesised by the graft or block polymerisation of unsaturated monomers with polyurethane macromonomers which have been functionalised to render them unsaturated. In this connection, the unsaturated groups of the polyurethane macromonomers may be lateral or terminal groups. The unsaturated polyurethane macromonomer may have been prepared dissolved in an organic solvent, for example in the unsaturated monomer itself, or in the absence of solvents. Copolymerisation can be conducted in the aqueous or non-aqueous phase, namely before or after conversion into the aqueous dispersion.

Aqueous emulsions, particularly those which are free from emulsifiers, of crosslinkable polymer-polyurethane resins which contain hydroxyl groups are known from DE-A-44 13 737. These aqueous dispersions can be obtained by the joint chain extension of polyurethanes, which are free from urea groups and which comprise OH groups which are substantially terminal, together with polymers which contain hydroxyl groups and which are based on ethylenically unsaturated monomers, with diisocyanates in a non-aqueous medium, neutralisation of carboxyl groups which are present and which can be converted into anionic groups, and conversion of the resulting product into the aqueous phase. The aqueous binder vehicle dispersions which are obtained in this manner are very suitable as binder vehicles for aqueous base lacquers such as those which are used in the production of decorative multi-layer coatings in the field of motor vehicle coating.

The known aqueous base lacquers are in need of improvement as regards the stone impact resistance of the multi-layer coatings which are produced with them. If these aqueous base lacquers are used in repair coating operations in the context of mass production coating, for example for what is termed final assembly repair work, the adhesion of the base lacquer coats produced with them to the outer clear lacquer coat, particularly to a clear lacquer coat which has not been sanded, is insufficient for a multi-layer coating.

SUMMARY OF THE INVENTION

The object of the present invention is to provide an aqueous binder vehicle which is particularly suitable for the production of aqueous base lacquers having the level of properties of known aqueous base lacquers. In addition, the object-is- for the coating media, particularly aqueous base lacquers, which can be produced from these binder vehicles, to enable coatings, particularly multi-layer coatings, to be produced which exhibit improved stone impact resistance. Moreover, in the coating of motor vehicles these coating media should be capable of being used not only for the original coating operation but also for repair coating, particularly for the aforementioned final assembly repair operations. In this connection, base lacquer coats produced from them should exhibit satisfactory adhesion to the outer clear lacquer coat of a multi-layer coating, particularly when the clear lacquer coat is not sanded This object is achieved by aqueous binder vehicle dispersions which are obtainable by the joint reaction of I. 20 to 97% by weight of one or more polyurethane resins and/or polyurethane-urea resins containing at least one group which is reactive towards a chain extender IV), having a number average molecular weight (Mn) of 1000 to 10,000, and 8 to 80 milliequivalents per 100 g solid resin of ionic groups, groups which can be converted into ionic groups and/or hydrophilic groups, II. 0 to 30% by weight of one or more polyester resins having a number average molecular weight (Mn) of 500 to 5000, and having two or more of the same groups as in I) which are reactive towards the chain extender IV), and III. 3 to 80% by weight of one or more (meth)acrylic copolymers containing 0 to 40 milliequivalents per 100 g solid resin of ionic groups with the same charge as in component I) or groups which can be converted into such groups and/or hydrophilic groups, having at least two of the same groups as in I) and II) which are reactive towards the chain extender IV).

wherein the sum of the percentages by weight of components I) to III) is 100% by weight, and wherein at least 50% by weight of component III) with respect to the total amount of component III) has been produced in the presence of one or more of components I) and/or II), corresponding to at least 20% by weight of the total amount of the sum of components I) and II), with IV. one or more chain extenders IV) which comprise two or more reactive groups which are reactive with the reactive groups of components I), II), and III), neutralisation of at least part of the groups which are optionally present and which can be converted into ionic groups, and conversion into the aqueous phase.

The present invention also relates to the process for producing the aqueous binder vehicle dispersions which is characterised by the parameters which are recorded above for the definition of the binder vehicle dispersions.

According to the invention, the chain extender IV is preferably used in a molar ratio (or numerical ratio) of the groups from I, II and III which are reactive towards the chain extender IV to the reactive groups of IV from 1:1 to 10:1, most preferably from 1.05:1 to 10:1.

DETAILED DESCRIPTION OF THE PREFERRED EMBODIMENTS

The aqueous binder vehicle dispersions according to the invention contain hybrid polymers which are produced by the joint chain extension of (meth)acrylic copolymers, which have the same chemical functionality as the polyurethane(-urea) resins and the polyester resins which are optionally used, and which are produced by radical polymerisation in the presence of polyurethane(-urea) resins containing ionic and/or hydrophilic groups as well as other functional groups and optionally in addition in the presence of polyesters which are substantially free from ionic and/or hydrophilic groups but which are functionalised in the same manner. These (meth)acrylic copolymers optionally contain ionic groups with the same charge and/or hydrophilic groups. They are the reaction products of polyurethane(-urea) resins I), which contain groups which are reactive towards the reactive groups of component IV), and optionally of polyester resins II), with (meth)acrylic copolymers III), which are produced by radical polymerisation in the presence of I) and/or II) and which contain the same reactive groups, and with one or more components IV), wherein the reactive groups of component IV) are completely consumed. The polymeric reaction products may be of linear structure. In general, they are of branched structure or exist in the form of microgels. Without being bound to any one theory, they are covalently bonded polymer hybrids in the sense of interpenetrating networks. The dispersions according to the invention contain between 15 and 80 milliequivalents, preferably between 30 and 60 milliequivalents, of ionic and/or hydrophilic groups per 100 g resin solids, for example preferably corresponding to an acid number from 10 to 40 mg KOH/g with respect to the resin solids content of the dispersions. The binder vehicles according to the invention may contain groups which are capable of crosslinking. The groups which are capable of crosslinking may be the same groups which are reactive towards the reactive groups of component IV) or may be groups which are different therefrom. If groups which are capable of crosslinking are present, these are preferably present in an amount of 30 to 300 milliequivalents per 100 g resin solids. The preferred groups which are capable of crosslinking are hydroxyl groups, preferably corresponding to a hydroxyl number between 20 and 150 mg KOH/g solid resin.

Examples of the reactive groups of components I, II and III include hydroxyl groups, amino groups (e.g. primary or secondary amino groups), hydrazine groups, alkoxysilane groups, aldehyde groups, 1,3-dicarbonyl functions, acidic CH groups (which may result from 1,3-dicarbonyl functions, such as those which are known from acetoacetyl or malonic ester groups) or isocyanate groups.

Examples of the groups of the chain extender IV which exhibit complementary functionalities or complementary reactivities to those of the aforementioned groups include the same groups. For example, components I, II and III may contain hydroxyl groups and the chain extender may contain isocyanate groups, or vice versa. Other examples of complementary functionalities between components I, II and III, which are functionalised in the same manner, and the chain extender IV) include isocyanate groups in I), II) and III)/NH— and/or $NH_2$ groups in IV), alkoxysilane groups (ROSi groups where R=Cl–C8 alkyl) in I), II) and III)/hydroxyl groups in IV), 1,3-dicarbonyl functions, such as acetoacetyl or malonic ester groups for example, in I), II) and III)/isocyanate groups in IV), 1-3-dicarbonyl functions in I), II) and III)/aldehyde group(s) in IV), 1,3-dicarbonyl functions in I), II) and III)/$NH_2$ and/or NH—$NH_2$ in IV), etc. Components I) and/or II) should contain no olefinically unsaturated double bonds. Examples of chain extenders IV) containing aldehyde group(s) include polyaldehydes such as glyoxal or glutaraldehyde for example, although formaldehyde is preferred. Chain extenders IV) containing hydroxyl groups may be polyols, but also may advantageously be water. In this connection, it should be remarked that water acts as a chain extender IV) in that it first hydrolyses the reactive groups of components I), II) and III). For example, alkoxysilane groups may be present in I), II) and III) or isocyanate groups may be present in I), II) and III), and may be hydrolysed with water, whereupon chain extension then sets in due to condensation reactions and/or addition reactions. Thus, for example, alkoxysilane groups can be hydrolysed to silanol groups (HOSi groups), which subsequently effect chain extension by condensation with the formation of siloxane bridges (—Si—O—Si—), whilst isocyanate groups can be hydrolysed by water to form $NH_2$ groups with the release of carbon dioxide, and result in chain extension with further isocyanate groups by addition with the formation of urea groups. The preferred combinations are OH groups in I), II) and III)/isocyanate groups in IV) or vice versa, or alkoxysilane groups in I), II) and III) and water in the stoichiometrically required amount as component IV).

In the case of alkoxysilane groups in I), II) and III) and water as component IV), the total amount of water which is necessary for producing the dispersion can be used. However, hydrolysis is preferably first effected with a reduced amount of water, preferably up to a ten-fold stoichiometric excess, most preferably with one to five times the stoichiometric amount of water, calculated based on the amount which is necessary for the hydrolysis of the ROSi groups. Chain extension of the ROSi-functionalised components I), II) and III) is effected after the addition of what is preferably up to a ten-fold stoichiometric excess of the amount of water which is necessary for the hydrolysis of the ROSi groups. Hydrolysis of the ROSi groups proceeds rapidly. The HOSi groups which are formed by hydrolysis condense to form siloxane bridges, with water being split off, and thus result in the binder vehicle according to the invention which has an extended chain. Formation of the siloxane bridges occurs in the dispersed or non-dispersed resin phase, i.e. before or after conversion into the aqueous dispersion.

The groups of I), II) and III) which exhibit-complementary reactivity to the reactive groups of component IV) can be introduced directly into components I), II) and III) by targeted synthesis, for example by the use of corresponding monomeric compounds during the synthesis of these components. However, they can also be introduced, for example, by the polymer-like reaction of suitably functionalised components I), II) and/or III) and suitable monomeric compounds. For example, components I), II) and/or III) may be hydroxy-functional and may be acetoacetylated by a polymer-like reaction with acetoacetic acid derivatives, e.g. alkyl esters, in order to obtain a 1,3-dicarbonyl group; or components I), II) and/or III) may be isocyanate-functional for example, and may be converted into components I), II) and/or III) which contain alkoxysilane groups by a polymer-like reaction with aminopropyltriethoxysilane.

Component I), and optionally component III) also, contains ionic groups, groups which can be converted into ionic groups and/or hydrophilic groups; they preferably only contain ionic groups or groups which can be converted into such groups.

The ionic groups may be cationic or preferably anionic groups. The groups of component I) and optionally of component III) also which can be converted into ionic groups may be groups which can be converted into anionic or cationic groups; groups which can be converted into anionic groups are preferred. Examples of groups which can be converted into anionic groups include acid groups or base groups. Conversion into ionic groups is preferably effected by neutralisation. Examples of groups which can be converted into cationic groups by neutralisation with acids, preferably organic acids such as formic acid or acetic acid for example, include primary, secondary or tertiary amine groups. Examples of the preferred groups which can be converted into anionic groups by neutralisation with bases, preferably amines or amino alcohols for example, include sulphonic acid groups, phosphoric or phosphonic acid groups, and are most preferably carboxyl groups.

The hydrophilic groups may be polyalkylene oxide groups, for example, and are preferably polyethylene oxide groups. In this respect, the quantitative statement "milliequivalents per 100 g" refers to the lowest molecular weight constituents of such groups, namely, for example, to alkylene oxide units in polyalkylene oxide groups, e.g. to ethylene oxide units in polyethylene oxide groups (units of this type are also called repetition units).

The polyurethane(-urea)s of component I), which are used in amounts between 20 and 97% by weight, preferably between 70 and 95% by weight, with respect to the sum of components I), II) and III), have a number average molecular weight (Mn) of 1000 to 10,000, and they contain 8 to 80 milliequivalents per 100 g solids of ionic groups, groups which can be converted into ionic groups and/or hydrophilic groups. They should preferably contain ionic groups or substituents which can be converted into ionic groups, particularly groups which can be converted into anionic groups, such as acid groups, e.g. sulphonic acid, phosphonic acid or carboxylic acid groups. Sterically hindered carboxylic acid groups are preferred. The acid number should be between 5 and 50, particularly less than 30; it ensures a stable dispersion in the aqueous phase after the neutralisation of at least part of these groups. It is possible at the same time for proportions of other polar, hydrophilic groups also to be present in the molecule, such as polyalkylene oxide groups for example, preferably polyethylene oxide groups. These enhance the stabilisation of the aqueous dispersion according to the invention. The polyurethane(-urea)s preferably have a linear structure. The groups of the polyurethane(-urea) or polyurethane(-urea)s of component I) which are reactive towards the reactive groups of component IV) may be disposed as lateral groups; they are preferably terminal groups. The polyurethane(-urea)s I) preferably contain hydroxyl groups as the groups which are reactive towards component IV) and their hydroxyl number is between 5 and 150, particularly greater than 10 and less than 120 mg KOH/g. The polyurethane(-urea)s of component I) preferably contain no olefinically unsaturated double bonds; no copolymerisation for the synthesis of the (meth) acrylic copolymer III) can take place with olefinically unsaturated monomers.

Polyurethane resins and/or polyurethane-urea resins, hereinafter called polyurethane(-urea)s, can be used as component I), such as those which are known as functionalised polyurethane binder vehicles for example. These are polyurethane resins which can be converted into the aqueous phase via ionic groups. They additionally contain at least two groups which are reactive towards component IV). OH groups are particularly preferred. They are generally polyurethanes which can be produced based on polyester polyols, polycarbonate polyols and/or polyether polyols, particularly polymer diols, which are reacted. Optionally with the use of low molecular weight, optionally polyfunctional hydroxyl and/or amine compounds, with di- or polyisocyanates and with compounds which are functional, preferably difunctional, in relation to isocyanates and which contain ionic groups, groups which can be converted into ionic groups and/or hydrophilic groups. Low molecular weight compounds are preferably employed as compounds containing more than one, preferably two groups which react with isocyanate groups, and which contain at least one ionic group, group capable of forming ions and/or hydrophilic group. Anionic or anion-forming groups are preferred. Suitable groups which react with isocyanates comprise hydroxyl groups and primary and secondary amino groups in particular. Examples of suitable acidic groups which are capable of forming anions include carboxyl, phosphoric acid and sulphonic acid groups. Examples of basic groups which can be converted into cations include primary, secondary and tertiary amino groups, or onium groups such as quaternary ammonium, phosphonium and/or tertiary sulphonium groups. The anionic groups which are preferably introduced according to the invention are carboxyl groups; these can be introduced, for example, by the use of hydroxyalkane carboxylic acids, particularly dihydroxyalkanoic acids. The preferred dihydroxyalkanoic acids are α,α-dimethylolalkanoic acids. The most preferred compounds are α,α-dimethylolpropionic acid and α,α-dimethylolbutyric acid. Acidic polyesters may also be used, such as those described in DE-A-39 03 804 for example. These polyesters preferably have a molecular weight from 300 to 2000, a hydroxyl number from 56 to 374, and an acid number from 28 to 187. Examples of non-ionic hydrophilic polyols are compounds which contain polyether chains based on ethylene oxide and/or propylene oxide units. These anionic, cationic or non-ionic groups serve to stabilise the aqueous dispersion. Ionic and non-ionic groups can be used jointly. Stabilisation by ionic groups is preferred; stabilisation by anionic groups is particularly preferred.

For the synthesis of polyurethane(-urea)s I), it is advisable to select components which are known to be as resistant as possible to weathering and which exhibit no tendency towards yellowing.

The production of component I) may be effected in various ways. Thus, for example, it is possible to employ a stoichiometric deficit of isocyanate groups, whereupon polyurethane polyols are obtained directly. These may optionally have their chains extended via polyisocyanate. However, it is also possible to employ an excess of isocyanate. Polyurethane prepolymers terminated with isocyanate groups are then obtained. These can have their chains extended by reaction with diols or other compounds which react with isocyanates.

The synthesis of the polyurethane polymers of component I) is generally conducted in the absence of water. In order to reduce the viscosity, it is possible to add solvents which do not react with isocyanate groups. In this respect, solvents are preferably selected which do not result in troublesome effects in the coating medium after conversion into the aqueous phase. Solvents which are miscible with water are particularly suitable. If necessary, it is possible to reduce the solvent content, or to remove it completely, by distillation.

The polyester resins of component II), which are optionally used, but which are preferably used in amounts between 2 and 20% by weight with respect to the sum of components I), II) and III), are those which have a number average molecular weight (Mn) from 500 to 5000. On average, they contain two or more groups which are reactive towards the chain extender IV) and which correspond to those of components I) and III). They are preferably polyester polyols with a hydroxyl number between 50 and 300 mg KOH/g. The polyester resins of component II) preferably have a branched structure and are substantially free from ionic groups, groups which can be converted into ionic groups, and/or hydrophilic groups. They have correspondingly low acid numbers from 0 to 5 mg KOH/g, for example. They are advantageously synthesised from polyol and polycarboxylic acid (anhydride) components which are known to be as resistant to weathering as possible and which exhibit no tendency towards yellowing. The polyester resins of component II) contain no olefinically unsaturated double bonds; no copolymerisation for the synthesis of the (meth)acrylic copolymer III) can take place with olefinically unsaturated monomers. The polyesters are preferably synthesised with the incorporation of natural or synthetic, saturated C6–C40 fatty acids and/or fatty alcohols, including dimeric fatty acids and/or alcohols also.

The molecular weight of the (meth)acrylic copolymer or copolymers of component III), which are used in amounts from 3 to 80% by weight, preferably from 5 to 40% by weight, with respect to the sum of components I), II) and III), is subject to no restriction and can be varied within wide limits. For example, their number average molecular weight (Mn) may be between 1000 and 50,000, e.g. 2000 to 20,000. They contain 0 to 40 milliequivalents per 100 g solids of groups which can be converted into ionic groups which have the same charge as in component I) and/or hydrophilic groups, and contain 50 to 750 milliequivalents per 100 g solids of groups which are reactive towards the chain extender IV), preferably hydroxyl groups.

It is essential to the invention that at least 50% by weight, preferably more than 70% by weight, of the total amount of (meth)acrylic copolymer III), and most preferably the total amount of (meth)acrylic copolymer III) is produced in the presence of at least 20% by weight, preferably more than 30% by weight, most preferably more than 40% by weight of the total amount of component I) and/or II); component I) is preferably present.

If a plurality of components I) and/or II) is used, these may be present as a mixture during the production of (meth)acrylic copolymer III), or only one or only part of components I) and/or II) may be used and the remaining parts may be added later. The production of (meth)acrylic copolymers III) can be effected by radical polymerisation by the usual methods. In this connection, the reaction conditions are selected so that graft reactions resulting from abstractions of hydrogen are substantially suppressed on component I) and/or II). For this purpose, for example, at least 20% by weight. preferably more than 30% by weight, most preferably more than 40% by weight, of components I) and/or II) may be placed in the reaction vessel, optionally in admixture with one or more organic solvents, and heated to the reaction temperature, whereupon at least 50% by weight, preferably more than 70% by weight, most preferably the total amount of the monomer mixture, which optionally contains radical initiators, for the synthesis of (meth)acrylic copolymer III) is added. The residual amount which optionally remains of the monomer mixture, which optionally contains radical initiators, for the synthesis of (meth)acrylic copolymer III) may be polymerised by a radical mechanism in the same manner, wherein an organic solvent is optionally placed in the reaction vessel without proportions of components I) and/or II), the batch is heated to the reaction temperature, and the procedure thereafter is as described above. The (meth)acrylic copolymer III) which is obtained by the polymerisation of the residual amount of monomer mixture which optionally remains can then subsequently be admixed with the (meth)acrylic copolymer III) which was synthesised in the presence of components I) and/or II).

The expression "(meth)acrylic" which is used in the present description is synonymous with "acrylic and/or methacrylic".

The polymerisation is conducted at temperatures between 80° C. and 180° C., for example, preferably at 100° C. to 150° C.

The polymerisation reaction can be initiated with known radical initiators, for example peroxide compounds, azo initiators or radical initiators which effect C—C cleavage.

The polymerisation initiators are generally added in an amount of 0.1 to 4% by weight with respect to the amount of monomer weighed in for the synthesis of (meth)acrylic copolymer III). The monomers can also be added separately or in a chronologically staggered manner during the polymerisation. The monomers or the monomer mixture used may contain the radical initiators, or the radical initiators may be added to the monomer mixture, optionally in a slightly chronologically staggered manner or separately.

The production of (meth)acrylic copolymer III) is effected, as described above, in the presence of at least partial amounts of components I) and/or II), which are optionally placed in a vessel dissolved in an organic solvent. Examples of suitable solvents include water-thinnable solvents which are customary for lacquers, such as: glycol ethers such as butyl glycol, butyl diglycol, dipropylene glycol dimethyl ether, dipropylene glycol monomethyl ether, or ethylene glycol dimethyl ether, or alcohols such as ethanol, propanol or isopropanol.

The (meth)acrylic copolymers III) are synthesised by radical polymerisation from unsaturated monomers which contain groups which are reactive towards the reactive groups of component IV), and from other unsaturated monomers which may optionally also contain other reactive groups. The (meth)acrylic copolymers III) are preferably polyhydroxy(meth)acrylate resins. Practically all monomers which can be polymerised by a radical mechanism are suitable as ethylenically unsaturated monomers.

Examples of unsaturated monomers include acrylic acid alkyl esters, methacrylic acid alkyl esters, and dialkyl esters of maleic acid and/or fumaric acid, where the alkyl radical is a $C_1$ to $C_{15}$ alkyl radical in each case, and is linear, branched or cycloaliphatic. Examples of other copolymerisable monomers include styrene or substituted styrenes, vinyltoluene, (meth)acrylamide and/or (meth)acrylonitrile.

(Meth)acrylic acid hydroxyalkyl esters are examples of monomers for the attainment of the preferred OH functionality. These preferably contain secondary hydroxyl groups, at least in part. Examples include the (meth)acrylic acid esters of 1,2-alkanediols containing 1 to 12 carbon atoms, for example hydroxyethyl (meth)acrylate, hydroxypropyl (meth)acrylate, hydroxybutyl (meth)acrylate and hydroxyalkyl (meth)acrylamides. Other examples of hydroxy-functional compounds which can be copolymerised include allyl alcohol or monovinyl ethers of polyols.

The (meth)acrylic copolymers III) should have a substantially linear structure. It is possible to employ small proportions of polyunsaturated monomers, for example up to 1% by weight with respect to the total amount of component III), for their production.

Their reactive functionality towards component IV) is preferably greater than 5. They are preferably polyhydroxy compounds with an OH number from 50 to 400, preferably from 100 to 350 mg KOH/g. The (meth)acrylic copolymers III) may contain between 0 and 40 milliequivalents of ionic groups, groups which can be converted into ionic groups, and/or hydrophilic groups per 100 g solid resin. They preferably contain anionic groups corresponding to an acid number between 0 and 20.

Low molecular weight, oligomeric or polymeric compounds which are free from ionic and/or hydrophilic groups and which have a reactive functionality which is complementary to the reactive groups of components I), II) and III) are preferably employed as chain extenders IV), as explained at the outset.

Organic polyisocyanates, particularly diisocyanates, which are known for the production of polyurethanes, are employed as the preferred NCO-functional components IV). Aliphatic, aromatic and/or cycloaliphatic polyisocyanates can be used. Polyisocyanates can also be used in which the functionality which exceeds the value of 2 has been blocked.

The known tri- and polyvalent lacquer polyisocyanates may be used in part as polyisocyanates. For example, these may be the reaction products of diisocyanates to form oligomers, such as isocyanurates, allophanates or biurets for example, or they may be reaction products with polyfunctional alcohols.

The binder vehicle content of the dispersion according to the invention is produced by the chain extension, with the chain extender IV), of component I), optionally of II), and of component III) which is produced in the presence of component I) and/or II). The chain extension can be conducted as a one-pot synthesis or sequentially. Conversion of the reaction product, which is optionally neutralised, into an aqueous dispersion by the addition of a sufficient amount of water may be effected during or after chain extension. Chain extension takes place in the resin phase. Therefore, if the resin has already been dispersed by the addition of a sufficient amount of water, chain extension takes place within the particles of the dispersion themselves. The components are employed so that during chain extension a molar ratio of the total reactive groups of components I), II) and III) to the reactive groups of component IV) is produced which ranges from 1:1 to 10:1, preferably 1.05 to 10 (most preferably up to 5):1.

Before conversion into an aqueous dispersion, the batch is completely or partially neutralised, unless the binder vehicle according to the invention already contains ionic and/or hydrophilic groups in a sufficient amount.

Examples of suitable neutralising agents for the preferred acidic groups which are capable of forming anions include the known organic amines or ammonia. The amines are primary, secondary, or particularly tertiary amines, which may optionally also contain other functional groups. Dialkylalkanolamines or alkyldialkanolamines are also particularly suitable. These can be added to the organic binder vehicle solution (to the reaction product obtained from I, II, III and IV), or they are incorporated as an aqueous solution.

Formation of the dispersion may be effected before or after the completion of the chain extension reaction. For this purpose, water is mixed in a sufficient amount with the resin, which is solvent-free or which is present in organic solution. It is also possible to add the main amount of water during chain extension. For example, it is possible to place the neutralised resins in a vessel and to mix them with water with good dispersion of the mixture. The aqueous phase, which optionally contains neutralising agents, can also be placed in a vessel and the resin can be incorporated with stirring. A continuous mode of operation is also possible, i.e. resin, water and neutralising agent are homogeneously mixed together simultaneously in known mixer units, e.g. in a rotor-stator mixer. This results in a finely divided aqueous dispersion of the binder vehicle according to the invention, which has an average particle size greater than 20 and less than 1000 nm, preferably greater than 50 and less than 500-nm. The particle size distribution may be monomodal or bimodal, and is preferably monomodal.

It may be necessary to remove the organic solvent used during production. This can be effected, for example, by distillation, e.g. under vacuum. In particular, those solvents which result in troublesome properties during use as a lacquer binder vehicle should be distilled off from the binder vehicle dispersion.

On the other hand, it may be advantageous to add specially selected organic solvents in order to influence the properties of the dispersion. Thus it is possible, for example, to increase the stability or miscibility with water of the binder vehicle dispersion by adding organic solvents which are at least partially miscible with water, e.g. glycols or glycol ethers.

The present invention also relates to the aqueous coating media which can be produced from the aqueous binder vehicle dispersions according to the invention.

The binder vehicle dispersions according to the invention can be further processed to form aqueous coating media, preferably aqueous base lacquers, optionally with the addition of further binder vehicles, optionally with the addition of crosslinking agents. pigments and/or extenders. These aqueous coating media may be self-drying (physically drying), or may crosslink chemically with the formation of covalent bonds.

In addition to the aqueous binder vehicle dispersion according to the invention, the coating media according to the invention may contain one or more further binder vehicles. This may be advantageous in order to obtain synergistic effects, for example. Examples of further binder vehicles include the customary film-forming water-soluble or water-thinnable resins which are familiar to one skilled in the art, such as water-thinnable polyester resins, water-thinnable polyacrylate resins, water-thinnable acrylated polyester resins and/or water-thinnable polyurethane resins. These may be reactive or non-functional resins. The amount of resins added may be 0 to 75% by weight, preferably 0 to 50% by weight, of the total resin solids. 0 to 30% by weight is particularly preferred. In this connection, the term "resin solids" means the sum of all the binder vehicles without any content of crosslinking agent.

Examples of preferred water-thinnable polyesters which can be used as additional binder vehicles include those which contain free carboxyl groups, i.e. polyesters with a high acid number. In principle, two methods of introducing the requisite carboxyl groups into the resin system are known. The first route consists of terminating the esterification when the desired acid number is reached. In this procedure, the incorporation of sterically hindered carboxyl groups, by condensation with dimethylolpropionic acid for example, is preferred. After neutralisation with bases, the polyesters obtained in this manner are water-thinnable. The second possibility consists of forming partial esters of di- or polycarboxylic acids with hydroxyl-rich polyesters which have a low acid number. Anhydrides of dicarboxylic acids are usually employed for this reaction, and are reacted under mild conditions with the hydroxyl component with the formation of a free carboxyl group.

The preferred water-thinnable polyacrylate resins which can be used as additional binder vehicles may contain free carboxyl groups, just like the polyester resins described above. Examples include (meth)acrylic copolymers, where the carboxyl groups originate from their contents of acrylic or methacrylic acid.

Additional polyurethane dispersions are preferably to be understood, for example, as those which are described in DE-A-36 28 125. These are anionically stabilised PU dispersions which can be produced by the reaction of polyols diisocyanates, ionic compounds and by chain extension with amines. Moreover, PU dispersions stabilised by non-ionic hydrophilic groups may also be added to the coating media according to the invention.

Acrylated or grafted polyesters or polyurethane resins, such as those described in DE-A-41 22 265 for example, may also be used as additional water-thinnable binder vehicles.

A further group of aqueous dispersions which can be added to the coating media according to the invention are the dispersions described in DE-A-36 28 124, which are based on ionic condensation polymers, which contain epoxide groups and which are reacted with copolymerisable unsaturated monomers.

When further binder vehicles are added, it is self-evident that additional ionically stabilised resins and dispersions can only be used together with dispersions according to the invention which have the same type of charge, so as not to have a negative effect on stability.

Various crosslinking agents can be used for the preparation of the coating media according to the invention. Examples of these include formaldehyde condensation resins, such as phenol-formaldehyde condensation resins or amine-formaldehyde condensation resins, as well as free or blocked polyisocyanates. The crosslinking agents may be used individually or in admixture. The mixture ratio of crosslinking agent to binder vehicle resin(s) is preferably 10:90 to 40:60, most preferably 20:80 to 30:70, with respect to the weight of solids in each case.

Examples of amine resins which are suitable as crosslinking agents comprise alkylated condensates which are produced by the reaction of aminotriazines and amidotriazines with aldehydes. Compounds containing amine or amino groups, such as melamine, guanamine, acetoguanamine, benzoguanamine, dicyandiamide or urea, are condensed by known industrial methods with aldehydes, particularly formaldehyde, in the presence of alcohols, such as methanol, ethanol, propanol, butanol or hexanol. Examples of resins of this type and of their production are described in Houben-Weyl, "Methoden der organischen Chemie", 1963, page 357. These products are commonly available commercial products.

Blocked polyisocyanates can also be used as crosslinking agents. Any polyisocyanates can be used in which the isocyanate groups have been reacted with a volatile monofunctional compound which is reactive towards isocyanate. Diisocyanates, as well as polyisocyanates containing more than two isocyanate groups per molecule which are derived therefrom, can be employed as polyisocyanates, such as biuret- and isocyanurate polyisocyanates or prepolymers which contain terminal isocyanate groups and which are derived from a polyol by reaction with excess diisocyanate for example. The polyisocyanates which were mentioned as the preferred chain extender IV) can be used, for example.

The blocked polyisocyanates which can be used according to the invention as crosslinking agents may be blocked with customary volatile monovalent blocking agents, such as those which are used in lacquer chemistry. Examples of these include various alcohols, oximes, phenols, caprolactam, NH-functional nitrogen heterocycles such as pyrazole derivatives or triazole derivatives, amines, acidic CH compounds such as malonic ester or acetoacetic ester, and phthalimide. The polyisocyanates may be blocked in the same molecule with the same or different blocking agents. Mixtures of differently blocked polyisocyanates can also be used as crosslinking agents, as can polyisocyanates which are differently blocked intramolecularly.

For two-component coating media the crosslinking agents are added directly before application. Free polyisocyanates are preferably used here. In this respect, the polyisocyanates which are used may be the same as those which are used for the production of the blocked polyisocyanates.

In addition, the coating media according to the invention may contain polymer microparticles which are known to one skilled in the art. Crosslinked or un-crosslinked microparticles may be used. Examples of polymer microparticles such as these are described in EP-A-0 038 127 and EP-A-0 234 362.

The coating media according to the invention may also contain customary lacquer additives, for example rheology-influencing agents such as highly dispersed hydrated silica, inorganic layer silicates or polymeric urea compounds. Examples of substances which act as thickeners also include water-soluble cellulose ethers such as hydroxyethyl cellulose, methyl cellulose or carboxymethyl cellulose, as well as synthetic polymers containing ionic groups or groups with an associative action such as polypeptides, polyvinyl alcohol, poly(meth)acrylamide, poly(meth)acrylic acid, polyvinyl pyrrolidone, styrene-maleic anhydride or ethylene-maleic anhydride copolymers and derivatives thereof, and also hydrophobically modified ethoxylated polyurethanes or polyacrylates. In addition, anti-settling agents, levelling agents, light stabilisers, antifoaming agents such as compounds containing silicones for example, surface-active agents and bonding agents can also be used. The term "surface-active agents" should also be understood to mean known paste resins, such as those which are described in EP-A-0 438 090 for example, which can be used to promote better dispersion and comminution of the pigments. Catalysts may optionally be used to speed up hardening; however, it is also possible to employ thermal energy for hardening without the use of a catalyst.

The usual industrial lacquer solvents are suitable as solvents present in small amounts. These may stem from the production of the binder vehicle or may be added separately. Examples of solvents such as these include mono- or polyhydric alcohols, e.g. propanol, butanol or hexanol; glycol ethers or esters, e.g. diethylene glycol dialkyl ethers, dipropylene glycol dialkyl ethers, each containing a C1–6 alkyl, ethoxypropanol or butyl glycol; glycols e.g. ethylene glycol, propylene glycol and oligomers thereof; N-methylpyrrolidone, as well as ketones such as methyl ethyl ketone, acetone or cyclohexanone.

The coating media according to the invention may contain one or more inorganic and/or organic colour- or effect-imparting pigments and optionally at least one extender in addition.

Examples of effect-imparting pigments include metal pigments, e.g. those comprising aluminium, copper or other metals; interference pigments, such as metal pigments coated with metal oxides, e.g. titania-coated aluminium, coated mica, such as titania-coated mica, for example, and graphite effect pigments. Examples of colour-imparting pigments and fillers include titania, micronised titania, iron oxide pigments, carbon black, silica. barium sulphate, micronised mica, french chalk, kaolin, chalk, azo pigments, phthalocyanine pigments, quinacridone pigments, pyrrolopyrrole pigments and perylene pigments.

The effect pigments are generally employed in the form of a commercially available aqueous or non-aqueous paste, are optionally mixed with organic solvents and additives, which are preferably water-thinnable, and thereafter mixed with the aqueous binder vehicle with shearing. Effect pigments in powder form may first be processed to form a paste with organic solvents and additives, which are preferably water-thinnable. In this respect it must be ensured that lamellar effect pigments are not mechanically damaged during mixing.

Coloured pigments and/or fillers may be made into a paste in a portion of the aqueous binder vehicle, for example. Paste formation may also preferably be effected in a special water-thinnable paste resin. An example of a paste resin based on polyurethane which is preferably used in the aqueous base lacquer according to the invention is given in EP-A-0 438 090. This example also constitutes a coadjuvant binder vehicle which is outstandingly suitable for use in solvent-based, colour- and/or effect-imparting base lacquers for the purpose of improving the condition of the lacquer and the resistance to stone impact in particular. Paste formation may be effected in the customary processing units known to one skilled in the art.

Thereafter, paste formation is carried out to completion with the residual proportion of the aqueous binder vehicle or of the aqueous paste resin to produce the finished coloured pigment paste. If paste resins are present in the coating medium, these are added to the binder vehicle plus the crosslinking agent which is optionally present for the calculation of the resin solids.

The coating media which are produced based on the aqueous binder vehicle dispersions according to the invention are coating media for the production of colour- and/or effect-imparting base coats, primer surfacer or stone impact protection coats or single-component covering lacquer coats, for example. The binder vehicle dispersions according to the invention are particularly suitable for the production of aqueous base lacquers, such as those which are used for multi-layer coatings and which are overcoated with transparent clear lacquers. An aqueous base lacquer such as this may have a solids content of 10–50% by weight, for example. For effect-based lacquers this is preferably 15–30% by weight, for example, and for single-colour base lacquers it is preferably higher, for example 20–45% by weight. The ratio of pigment to binder vehicle plus the optional crosslinking agents plus the optional paste resin in the aqueous base lacquer may be between 0.03:1 and 3:1, for example. For effect-based lacquers this is preferably 0.06:1 to 0.6:1, for example, and for single-colour base lacquers it is preferably higher, for example 0.06:1 to 2.5:1, based on the weight of solids in each case.

The solvent content of the aqueous base lacquers according to the invention is preferably less than 20% by weight, more preferably less than 15% by weight, most preferably less than 10% by weight.

The aqueous base lacquers according to the invention may be applied by the usual methods. They are preferably applied by spraying to give a dry coat thickness of 8 to 50 $\mu$m. For effect-based lacquers the dry coat thickness is preferably 10 to 25 $\mu$m, for example, and for single-colour base lacquers it is preferably greater, for example 10 to 40 $\mu$m. Application is preferably effected by the wet-into-wet process, i.e. after an air ventilation phase, e.g. at 20–80° C., the aqueous base lacquer coats are overpainted with a customary clear lacquer to give a dry coat thickness of preferably 30–60 $\mu$m and are crosslinked jointly with the latter at temperatures of 20 to 140° C., for example. The drying conditions for the covering lacquer coat (base lacquer and clear lacquer) depend on the clear lacquer system used. They may involve temperatures of 20 to 150° C., for example. Temperatures of 20 to 80° C. are preferred for repair purposes, for example. Temperatures above 100° C., for example above 110° C., are preferred for mass production coating purposes.

In principle, all known clear lacquers or transparent pigmented coating media are suitable as the clear lacquer. 1- or 2-component lacquers containing solvents, water-thinnable clear lacquers, clear powder coatings or radiation-hardenable clear lacquers may all be used in this respect.

Multi-layer coatings produced in this manner may be applied to very different types of substrates. The latter are generally metallic or plastics substrates. They are frequently pre-coated, i.e. plastics substrates may be provided with a plastic primer coat for example. Metallic substrates generally have an electrophoretically deposited primer coat and optionally one or more further lacquer coats in addition, such as a primer surfacer coat for example. These coats are generally hardened. The aqueous base lacquer according to the invention may, however, be applied wet-into-wet to uncrosslinked primer surfacer coats, as described in EP-A-0 238 037 for example. In this case the base lacquer is generally stoved jointly with the primer surfacer coat before the application of a clear lacquer covering coat.

It is also possible to apply the aqueous base lacquer according to the invention directly, without additional intermediate coats, to a stoved or un-stoved electrodip lacquer coat, as is also possible for other known solvent-based or aqueous base lacquers.

The coating media according to the invention are also outstandingly suitable for coating other substrates, particularly mineral substrates such as concrete, and for wood, for coating films (plastics and paper films), and for the production of thin layers for the adhesive bonding of a plurality of substrates.

Multi-layer coatings obtained using aqueous base lacquers according to the invention fulfil the requirements which are currently customary for motor vehicle coating operations. The aqueous base lacquers according to the invention are suitable for the original coating of vehicles, including repair coating operations in the context of mass production coating operations, e.g. for final assembly repair coating operations, as well as for use in the field of auto repair coating outside the automobile factory. They can also be used in other areas, however, e.g. for plastics coating, particularly for the coating of vehicle components. The stoving conditions for repair coating operations may involve temperatures within the range from 60 to 160° C., for example.

The present invention further relates to a substrate which is coated with a multi-layer coating which has been obtained by the application of at least one primer coat, preferably based on a water-thinnable coating medium, application of a colour- and/or effect-imparting base lacquer coat comprising a coating medium according to the invention, drying the base coat if necessary and the application of a transparent coating medium as a covering coat, and finally heating the coated substrate. Other additional coats may optionally be added to this multi-layer coating.

The multilayer coating according to the invention has a good surface and good resistance to stone impact. The adhesion between the coats and the base lacquer coat is good and exhibits no de-bonding defects, even when subjected to a humidity cabinet environment. Good adhesion is also exhibited by a two-layer repair coating, which is produced using the aqueous coating medium according to the invention, and which is applied to the outer clear lacquer coat, which has not been sanded, of a multi-layer coating, for example a multi-layer coating according to the invention. The invention is particularly suitable for use in the coating of automobiles (mass production and repair coating).

EXAMPLE 1
(Preparation of a Hydroxy-functional Acrylate Resin)

598.6 g methyl isobutyl ketone were heated to 110° C. A mixture of 1106.8 g hydroxypropyl acrylate, 276.8 g butyl acrylate and 13.8 g tert.-butyl-per-2-ethylhexanoate was steadily added over a period of 4 hours. Thereafter the batch was held at 110° C. for a further hour. 4 g tert.-butyl-per-2-ethylhexanoate were then added. The batch was held at 110° C. for a further 1.5 hours.

EXAMPLE 2
(Preparation of a Branched, Hydroxy-functional Polyester)

644 g trimethylolpropane, 542 g coconut oil acid, 511 g 1,4-cyclohexanedicarboxylic acid and 100 g xylene were heated, with the water of reaction being removed by azeotropic distillation, until an acid number less than 2 mg KOH/g was obtained. The xylene was subsequently distilled off.

EXAMPLE 3

(Preparation of a Binder Vehicle)

a) Preparation of a Carboxy-functional Polymer Containing Epoxide Groups 100 g of an anhydride mixture (Acid No./$H_2O$=486), prepared by the reaction of trimellitic anhydride with 1,2-propanediol, and thus consisting of trimellitic anhydride and anhydrides of the following formulae:

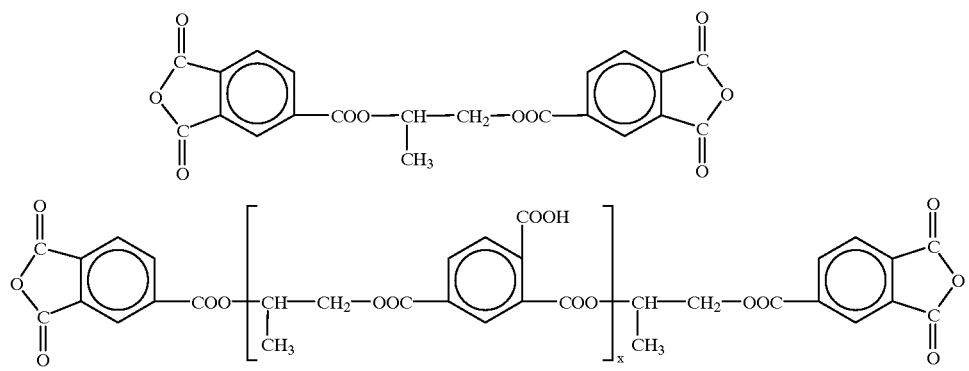

where x=1 to 8,
which had been homogenised in 108 g xylene at 50° C., were added drop-wise over 1 hour to a solution in 70 g methyl ethyl ketone of 141 g of a polyester (OH No.=88 mg KOH/g) which was prepared based on phthalic anhydride, isophthalic acid, maleic anhydride, propanol and glycerine as described in DE-OS 28 11 913. The reaction mixture was stirred at 90° C. until it had reached an acid number in water of 165 (100% resin). Thereafter, 12 g water were admixed, and an acid number in butanol of 168 mg KOH/g (100% resin) was obtained after stirring for 6 hours at 80 to 90° C. The temperature of the mixture was reduced to 60° C., and after adding 0.3 g lithium benzoate, 132 g of an epoxidised linseed oil (epoxide number=8.7) were added drop-wise over 2 hours. The mixture was stirred until the acid number in butanol had decreased to 86.5. A mixture of 42 g dimethylamine (60% in water) in 860 g water was then stirred in. A light yellow, opalescent solution was obtained, from which the organic solvent was removed by distillation at 0.1 bar and 40° C. After filtration, a yellowish, practically clear, aqueous resin solution was obtained. Solids content: 32% (1 hour at 125° C.).

b) Preparation of a Polymer Dispersion 705 g of the above aqueous (32%) dispersion and 196 g water were introduced into a reactor fitted with a stirrer, reflux condenser, internal thermometer and a metering device for the monomers and for the initiator. This mixture was heated to 80° C. with stirring, and a solution of 0.5 g ammonium peroxydisulphate in 35 g water was added. Five minutes after the addition of the initiator, 35 g of a monomer mixture comprising 125 g methyl methacrylate, 94 g n-butyl acrylate and 17 g glycidyl methacrylate were added, and after a further 15 minutes of prepolymerisation the remaining amount of monomer was added over 2 hours. 10 minutes after the addition was complete, a further 0.2 g ammonium peroxydisulphate, dissolved in 10 g water, was added over 10 minutes, and the batch was stirred for a further 2 hours at 80° C. in order to effect complete reaction. A stable aqueous dispersion was obtained, the solids content of which was adjusted to 35% by weight with deionised water.

EXAMPLE 4
(Preparation of a Dispersion of a Hybrid Polymer: Comparative Example)

28.8 g dimethylolpropionic acid, 374.6 g acetone and 164.8 g N-methylpyrrolidone were weighed in and heated to 65° C. After dissolution of the acid, 108 g isophorone diisocyanate (IPDI) were added at 50° C. The batch was subsequently heated to 65° C. and maintained under reflux until an NCO number of about 4% was reached. Thereafter, 325.2 g of a polyester of adipic acid, hexanediol and isophthalic acid (OH number=105 mg KOH/g), as well as 1.8 g trimethylolpropane, were added at 50° C. The mixture was heated under reflux until an NCO number less than 0.3% was reached. 93 g of the acrylate resin from Example 1, 27 g IPDI and 0.6 g dibutyltin dilaurate (DBTL) were added in succession at 50° C. The mixture was maintained under reflux until an NCO number less than 0.3% was reached. Thereafter, 47.4 g of a 50% aqueous solution of dimethylisopropanolamine were added at 50° C. and the batch was held at this temperature for 15 minutes. 828.6 g deionised water were then added over 15 minutes for the formation of the dispersion. After forming the dispersion, the batch was heated to 90° C. and acetone and methyl isobutyl ketone were distilled off under vacuum.

EXAMPLE 5
(Preparation of a Dispersion of a Hybrid Polymer: According to the Invention)

The procedure employed was as in Example 4, with the difference that after adding the trimethylolpropane and reacting until an NCO number less than 0.3% was reached, a mixture of 28 g methyl isobutyl ketone, 51.4 g hydroxypropyl acrylate, 13.6 g butyl acrylate and 0.9 g tert.-butyl-per-2-ethylhexanoate was steadily metered in over 1.5 hours at 110° C. After 1 hour, a further 0.3 g tert.-butyl-per-2-ethylhexanoate were added and the batch was held for a further 1.5 hours at 110° C. After cooling to 50° C. and adding 27 g IPDI and 0.6 g DBTL, the procedure was continued as in Example 4.

EXAMPLE 6
(Preparation of a Dispersion of a Hybrid Polymer: Comparative Example)

34.2 dimethylolpropionic acid, 414 g of a polyester of adipic acid,-hexanediol and isophthalic acid (OH number= 105 mg KOH/g) and 204.8 g N-methylpyrrolidone were weighed in and heated to 80° C. When the acid had dissolved, the batch was cooled to 50° C. and 125.4 g IPDI and 0.7 g DBTL were added. The batch was subsequently heated to 80° C. and held until an NCO number less than 0.3% was reached. 25.2 g of the polyester from Example 2 (OH number=220 mg KOH/g) and 84 g of the acrylate resin from Example 1 were then added, and the batch was heated to 80° C. 31.4 g IPDI were added at 80° C. The batch was held until an NCO number less than 0.3% was reached. Thereafter, 55 g of a 50% aqueous solution of dimethylisopropanolamine were added at 80° C. and the batch was held for 15 minutes. 1022.4 g deionised water were then added over 15 minutes in order to form the dispersion. After the formation of the dispersion, the batch was held for 3 hours at 80° C. to effect homogenisation, and methyl isobutyl ketone was subsequently distilled off at 90° C. under vacuum.

EXAMPLE 7
(Preparation of a Dispersion of a Hybrid Polymer: According to the Invention)

The procedure employed was firstly as in Example 6, with the difference that after adding the polyester from Example 2 and heating to 110° C. a mixture of 27 g methyl isobutyl ketone, 11.6 g butyl acrylate, 46.6 g hydroxypropyl acrylate and 0.6 g tert.-butyl-per-2-ethylhexanoate was added over a period of 1.5 hours. The batch was then held at 110° C. for 1 hour, and 0.2 g) tert.-butyl-per-2-ethylhexanoate were then added. After a further 1.5 hours at 110° C., the batch was cooled to 80° C. and 31.4 g IPDI were added. The subsequent procedure was as in Example 6.

Production of Aqueous Base Lacquers (Silver Metallic) and Multi-layer Coatings

EXAMPLES 8a–d 20 g of a commercially available aluminium paste, which contained 65% by weight aluminium and which was suitable for aqueous base lacquer, 20 g butyl glycol, 6 g N-methylpyrrolidone and 1 g of a commercially available wetting agent were mixed with each other to form a digested bronze paste. Thereafter, 1.4 g of a commercially available thickener based on polyacrylic acid (solids content 10% by weight; pH 7.5) were admixed. Thereafter, 90 g of the dispersion from Examples 4–7, 60 g of the dispersion from Example 3b, and 40 g of a customary paste resin (according to the Example in DE-A-40 00 889) were stirred into the digested bronze paste. 24 g of a commercially available melamine resin (Setamine US 138/BB 70 supplied by AKZO) were then added with stirring. The aqueous base lacquers obtained were each applied by spraying, to give a dry coat thickness of 15 μm, to customary phosphated bodywork panels which had been pre-coated by cathodic dip coating and with primer surfacer. The application was followed by a brief ventilation with air, and then by pre-drying for 10 minutes at 80° C. The specimens were then each overpainted with a commercially available two-component high solid automobile mass production clear lacquer (a two-component high solid clear lacquer based on acrylic resin/polyisocyanate) to give a dry coat thickness of 35 μm, and were dried for 30 minutes at 130° C. (workpiece temperature). Two series of tests were then performed:

1) The stoved clear lacquer coat, which had not been sanded, was overpainted under the conditions of a final assembly repair coating operation in each case, i.e. the two-layer lacquer structure consisting of an aqueous base lacquer coat and a clear lacquer coat was applied again, whereupon the aqueous base lacquer coat was pre-dried for 5 minutes at 80° C. and was dried together with the clear lacquer coat for 30 minutes at 85° C. (workpiece temperature).

2) The procedure employed was as in 1), with the difference that the aqueous base lacquer coat was dried together with the clear lacquer coat for 30 minutes at 140° C. (workpiece temperature).

The adhesion of the two-layer lacquer structures, which consisted of a base lacquer coat and a clear lacquer coat, was tested in each case before and after exposure to water of condensation, a) as an original coating and b) as a repair coating, as obtained in 1) and 2), respectively. Testing was performed by the cross-cut adhesion test according to DIN EN-ISO 2409. In addition, the stone impact resistance of the lacquer structures was tested (VDA stone impact test). The cross-cut adhesion values obtained are given in Table 1. The stone impact test results are summarised in Table 2.

TABLE 1

| Coating | Adhesion as original coating | | | Adhesion as repair coating | |
|---|---|---|---|---|---|
| | b | a(1 hr) | a(24 hr) | 1) a(24 hr) | 2) a(24 hr) |
| 8a (comp.) | 2–3 | 3 | 2 | 2–3 | 2 |
| 8b (inv.) | 1–2 | 2–3 | 1 | 2 | 1–2 |
| 8c (comp.) | 2–3 | 4 | 2 | 2 | 2 |
| 8d (inv.) | 1–2 | 1 | 1 | 1–2 | 1 |

TABLE 2

| Coating | VDA stone impact result on the original coating | VDA stone impact result on the repair coating 1) |
|---|---|---|
| 8a (comp.) | 3 | 6 |
| 8b (inv.) | 2 | 5 |
| 8c (comp.) | 2-3 | 5 |
| 8d (inv.) | 1-2 | 3-4 |

Legend to Tables 1 and 2
comp. comparative example
inv. example according to the invention
b, a(1 hr), a(24 hr) before, one hour after and 24 hours after exposure to water of condensation according to DIN 50017 (240 hours at 40° C.)
VDA stone impact test testing by means of a stone impact testing device (supplied by Erichsen, Model 508, at +20° C., using two lots of 500 g steel scrap (angular, 4–5 mm), accelerated by compressed air at 1.5 bar.

Assessment a) original coating: 0=no spalling off from the primer surfacer, 10=complete debonding;

b) repair coating: 0=no spalling off of the two-layer repair coating, consisting of a base lacquer coat and a clear lacquer coat, from the clear lacquer coat underneath, 10=complete debonding from the clear lacquer coat underneath.

What is claimed is:

1. An aqueous binder vehicle dispersion for coating media, obtained by the joint reaction of:

I. 20 to 97% by weight of one or more resins selected from the group consisting of polyurethane resins and polyurethane-urea resins containing at least one group which is reactive towards a chain extender IV), having a number average molecular weight (Mn) of 1000 to 10,000 and 8 to 80 milliequivalents per 100 g solid resin of one or more groups selected from ionic groups, groups which can be converted into ionic groups and hydrophilic groups, II. 0 to 30% by weight of one or more polyester resins having a number average molecular weight (Mn) of 500 to 5000, and having two or more of the same groups as in I) which are reactive towards the chain extender IV), and III. 3 to 80% by weight of one or more (meth)acrylic copolymers containing 0 to 40 milliequivalents per 100 g solid resin of ionic groups with the same charge as in component I) or groups which can be converted into such groups and/or hydrophilic groups, having at least two of the same groups as in I) and II) which are reactive towards the chain extender IV), wherein the sum of the percentages by weight of components I) to III) is 100% by weight, and wherein at least 50% by weight of component III) with respect to the total amount of component III) has been produced in the presence of one or more of components I) and/or II), corresponding to at least 20% by weight of the total amount of the sum of components I) and II), with IV. one or more chain extenders IV) which comprise two or more reactive groups which are reactive with the reactive groups of components I), II), and III), neutralisation of at least part of the groups which are optionally present and which can be converted into ionic groups, and conversion into the aqueous phase.

2. A process for producing the aqueous binder vehicle dispersions for coating media according to claim 1, comprising reacting:

I. 20 to 97% by weight of one or more resins selected from the group consisting of polyurethane resins and polyurethane-urea resins containing at least one group which is reactive towards a chain extender IV), having a number average molecular weight (Mn) of 1000 to 10,000 and 8 to 80 milliequivalents per 100 g solid resin of one or more groups selected from ionic groups, groups which can be converted into ionic groups and hydrophilic groups, II. 0 to 30% by weight of one or more polyester resins having a number average molecular weight (Mn) of 500 to 5000, and having two or more of the same groups as in I) which are reactive towards the chain extender IV), and III. 3 to 80% by weight of one or more (meth)acrylic copolymers containing 0 to 40 milliequivalents per 100 g solid resin of ionic groups with the same charge as in component I) or groups which can be converted into such groups and/or hydrophilic groups, having at least two of the same groups as in I) and II) which are reactive towards the chain extender IV), wherein the sum of the percentages by weight of components I) to III) is 100% by weight, and wherein at least 50% by weight of component III) with respect to the total amount of component III) has been produced in the presence of one or more of components I) and/or II), corresponding to at least 20% by weight of the total amount of the sum of components I) and II), and IV. one or more chain extenders IV) which comprise two or more reactive groups which are reactive with the reactive groups of components I), II), and III), wherein at least part of the groups which are optionally present and which can be converted into ionic groups are neutralised, and conversion is effected into the aqueous phase.

3. A binder vehicle dispersion according to claim 1 wherein the reactive groups of components I, II and III are hydroxyl groups, primary amino groups, secondary amino groups, hydrazine groups, alkoxysilane groups, aldehyde groups, 1,3-dicarbonyl-functions, acidic CH groups or isocyanate groups.

4. A binder dispersion according to claim 3, wherein the reactive groups of the chain extender IV are selected from hydroxyl groups, primary amino groups, secondary amino groups, hydrazine groups, alkoxysilane groups, aldehyde groups, 1,3-dicarbonyl-functions, acidic CH groups or isocyanate groups which have a complementary reactivity to the groups used in components I, II and III.

5. A binder vehicle dispersion according to claim 4, wherein the components I, II and III contain hydroxyl groups or isocyanate groups and the chain extender IV contains isocyanate groups or hydroxyl groups.

6. A binder vehicle dispersion according to claim 1, wherein the chain extender IV is used in a molar ratio of the groups from I, II and III which are reactive towards IV to the reactive groups of IV from 1:1 to 10:1.

7. An aqueous binder vehicle dispersion for coating media obtained by the joint reaction of:
- I. 20 to 97% by weight of one or more resins selected from the group consisting of polyurethane resins and polyurethane-urea resins containing at least one group which is reactive towards a chain extender IV), having a number average molecular weight (Mn) of 1000 to 10,000 and 8 to 80 milliequivalents per 100 g solid resin of one or more groups selected from ionic groups, groups which can be converted into ionic groups and hydrophilic groups,
- II. 0 to 30% by weight of one or more polyester resins having a number average molecular weight (Mn) of 500 to 5000, and having two or more of the same groups as in I) which are reactive towards the chain extender IV), and
- III. 3 to 80% by weight of one or more (meth)acrylic copolymers containing 0 to 40 milliequivalents per 100 g solid resin of ionic groups with the same charge as in component I) or groups which can be converted into such groups and/or hydrophilic groups, having at least two of the same groups as in I) and II) which are reactive towards the chain extender IV),
  wherein the sum of the percentages by weight of components I) to III) is 100% by weight,
  and wherein at least 50% by weight of component III) with respect to the total amount of component III) has been produced in the presence of one or more of components I) and/or II), corresponding to at least 20% by weight of the total amount of the sum of components I) and II), with
- IV. one or more chain extenders IV) which comprise two or more reactive groups which are reactive with the reactive groups of components I), II), and III), neutralisation of at least part of the groups which are optionally present and which can be converted into ionic groups, and conversion into the aqueous phase, wherein the reactive groups in I, II and III are alkoxysilane groups or isocyanate groups and water is used as the chain extender IV.

8. An aqueous coating medium comprising an aqueous dispersion according to claim 1.

9. A coating medium according to claim 8, comprising at least one member selected from the group consisting of further binder vehicles and crosslinking agents.

10. A process for coating with the aqueous dispersion according to claim 1 comprising:
producing a multi-layer coating with the aqueous dispersion.

11. A process according to claim 10, comprising producing multi-layer coatings for motor vehicles.

12. A process according to claim 11, comprising producing at least one of primer surface coats, base lacquer coats or clear lacquer coats for multi-layer coating.

13. A process according to claim 11, comprising producing repair coatings for motor vehicles.

14. A process for coating with the coating medium according to claim 8, comprising:
producing a multilayer coating with the coating medium.

15. A process according to claim 2, wherein the reactive groups of components I, II and III are hydroxyl groups, primary amino groups, secondary amino groups, hydrazine groups, alkoxysilane groups, aldehyde groups, 1,3-dicarbonyl-functions, acidic CH groups or isocyanate groups.

16. A process according to claim 15, wherein the reactive groups of the chain extender IV are selected from hydroxyl groups, primary amino groups, secondary amino groups, hydrazine groups, alkoxysilane groups, aldehyde groups, 1,3-dicarbonyl-functions, acidic CH groups or isocyanate groups which have a complementary reactivity to the groups used in components I, II and III.

17. A process according to claim 16, wherein said components I, II and III contain hydroxyl groups or isocyanate groups and the chain extender IV contains isocyanate groups or hydroxyl groups.

18. A process according to claim 2, wherein the chain extender IV is used in a molar ratio of the groups from I, II and III which are reactive towards IV to the reactive groups of IV from 1:1 to 10:1.

19. A process for producing the aqueous binder vehicle dispersions for coating media according to claim 1, comprising reacting:
- I. 20 to 97% by weight of one or more resins selected from the group consisting of polyurethane resins and polyurethane-urea resins containing at least one group which is reactive towards a chain extender IV), having a number average molecular weight (Mn) of 1000 to 10,000 and 8 to 80 milliequivalents per 100 g solid resin of one or more groups selected from ionic groups, groups which can be converted into ionic groups and hydrophilic groups,
- II. 0 to 30% by weight of one or more polyester resins having a number average molecular weight (Mn) of 500 to 5000, and having two or more of the same groups as in I) which are reactive towards the chain extender IV), and
- III. 3 to 80% by weight of one or more (meth)acrylic copolymers containing 0 to 40 milliequivalents per 100 g solid resin of ionic groups with the same charge as in component I) or groups which can be converted into such groups and/or hydrophilic groups, having at least two of the same groups as in I) and II) which are reactive towards the chain extender IV),
  wherein the sum of the percentages by weight of components I) to III) is 100% by weight,
  and wherein at least 50% by weight of component III) with respect to the total amount of component III) has been produced in the presence of one or more of components I) and/or II), corresponding to at least 20% by weight of the total amount of the sum of components I) and II), and
- IV. one or more chain extenders IV) which comprise two or more reactive groups which are reactive with the reactive groups of components I), II), and III),
  wherein at least part of the groups which are optionally present and which can be converted into ionic groups are neutralised, and conversion is effected into the aqueous phase,
  wherein the reactive groups in I, II and III are alkoxysilane groups or isocyanate groups and water is used as the chain extender IV.

* * * * *